(12) United States Patent
Aweya et al.

(10) Patent No.: US 6,901,593 B2
(45) Date of Patent: May 31, 2005

(54) ACTIVE QUEUE MANAGEMENT WITH FLOW PROPORTIONAL BUFFERING

(75) Inventors: James Aweya, Nepean (CA); Michel Ouellette, Rockland (CA); Delfin Y. Montuno, Kanata (CA)

(73) Assignee: Nortel Networks Limited (CA)

( * ) Notice: Subject to any disclaimer, the term of this patent is extended or adjusted under 35 U.S.C. 154(b) by 702 days.

(21) Appl. No.: 09/850,057

(22) Filed: May 8, 2001

(65) Prior Publication Data

US 2002/0188648 A1 Dec. 12, 2002

(51) Int. Cl.$^7$ ................................................. G06F 9/00
(52) U.S. Cl. ....................... 718/104; 370/230; 370/235; 370/236; 370/249; 370/352; 370/396; 370/400; 709/226; 709/228
(58) Field of Search ................................ 718/104, 100; 370/230, 235, 236, 249, 352, 396, 400; 709/226, 228

(56) References Cited

U.S. PATENT DOCUMENTS

| | | | |
|---|---|---|---|
| 6,324,165 B1 * | 11/2001 | Fan et al. | 370/232 |
| 6,333,917 B1 * | 12/2001 | Lyon et al. | 370/236 |
| 6,675,220 B1 * | 1/2004 | Bergamasco et al. | 709/232 |
| 6,717,912 B1 * | 4/2004 | Lemyre et al. | 370/230 |
| 6,744,767 B1 * | 6/2004 | Chiu et al. | 370/395.21 |

OTHER PUBLICATIONS

R.Morris, "Scalable TCP Congestion Control, "*Proc. IEEE infocom 200*, pp. 1176–1183.
C. Villamizar and C. Song, "High Performance TCP in ANSNET," *ACM Computer Commun,. Rev.*, vol. 24, No. 5, Oct. 1995.
R. Morris, "TCP Behavior with Many Flows," *IEEE Int'l Conf. Network Protocols*, Atlanta, Georgia, Oct. 1997.
W. Stevens, "TCP Slow Start, Congestion Avoidance, Fast Retransmit, and Fast Recovery Algorithms," *IETF RFC 2001*, Jan. 1997.
J. Aweya, D.Y. Montuno, M. Ouellette, "Method and Apparatus for Active Queue Management Based on Desired Queue Occupancy," U.S. Appl. No. 09/455,445, Dec. 1999.
S. Floyd and V. Jacobson, "Random Early Detection Gateways for Congestion Avoidance," *IEEE/ACM Trans. Networking*, vol. 1, No. 4, Aug. 1993, pp. 397–413.
B. Braden, et al., "Recommendation on Queue Management and Congestion Avoidance in the Internet," *IETF RFC 2309*, Apr. 1998.
L. Carter et al., "Exact and Approximate Membership Testers," *Proc. 10$^{th}$ annual ACM Symposium on Theory of Computing*, May 1978, pp. 59–65.
P.E. McKenney, "High–Speed Event Counting and Classification using a Dictionary Hash Technique," *International Conference on Parallel Processing*, 1989, pp. III–71–75.
R. Jain, "A Comparision of Hashing Schemes for Address Lookup in Computer Networks," Technical Report *Dec–TR–593*, Digital Equipment Corporation, Feb. 1989.
M.V. Ramakrishna et al., "Efficient Hardware Hashing Functions for High Performance Computers," *IEEE Trans. Computers*, vol. 46, No. 12, Dec. 1997, pp. 1378–1381.
G.F. Franklin, J.D. Powell and A. Emami–Naeini, *Feedback Control of Dynamic Systems*, Addison–Wesley Rending, Massachusetts, 1994.

* cited by examiner

*Primary Examiner*—Majid Banankhah
(74) *Attorney, Agent, or Firm*—Hunton & Williams LLP (57) ABSTRACT

A technique for an improved active queue management scheme which dynamically changes its threshold settings as the number of connections (and system load) changes is disclosed. Using this technique, network devices can effectively control packet losses and TCP timeouts while maintaining high link utilization. The technique also allows a network to support a larger number of connections during congestion periods.

14 Claims, 9 Drawing Sheets

ACTIVE QUEUE MANAGEMENT WITH FLOW PROPORTIONAL BUFFERING

FIELD OF THE INVENTION

The present invention relates generally to network queue management and, more particularly, to a technique for dynamically allocating buffers in proportion to the number of active Transmission Control Protocol (TCP) connections.

BACKGROUND OF THE INVENTION

A large factor in TCP's widespread use is its ability to utilize a network bottleneck, adapting to changes in offered load or available bandwidth. However, studies have shown that TCP's ability to share a bottleneck fairly and efficiently decreases as the number of flows increases. The performance of TCP becomes significantly degraded when the number of active TCP flows exceeds the network's bandwidth-delay product measured in packets. When the TCP sender's congestion window becomes less than 4 packets, TCP is no longer able to recover from a single packet loss since Fast-Retransmit needs at least 3 duplicate acknowledgments (ACKs) to get triggered. Thus, windows below 4 packets are not amenable to the fast retransmission feature of TCP and a single packet loss will send the connection into timeout. When fast retransmission fails, TCP falls into a conservative retransmission timeout of a second or more. Packet losses therefore affect data transfer delays in two ways: (1) by decreasing TCP's window size and sending rate, and (2) by forcing TCP into timeouts. This is because TCP adjusts its window size to reflect network conditions. Each time TCP decides that the network has discarded a packet, it cuts its window by half.

High loss rates in TCP/IP networks indicate that there is an excess of traffic and that the network has insufficient buffering or bandwidth capacity. To relieve congestion, the network has to drop many packets. However, dropping too many packets tends to penalize TCP users, forcing them into long timeout periods. Also, with inadequate buffering, TCP connections will tend to keep the buffers full and the resulting packet losses will force many of the connections into timeout. As link utilization grows, premature loss may occur long before full bottleneck utilization is achieved due to the bursty nature of TCP traffic. In addition, most TCP flows today can be characterized as short-lived flows. The fast retransmission feature of TCP requires a window size of several packets in order to work and short-lived flows often never achieve a large enough window size to be able to recover from a packet loss without entering timeout. One way to solve this problem is to provide routers with not just one round-trip time of buffering, but buffering proportional to the total number of active flows. P. Morris, "TCP Behavior with Many Flows," IEEE Int'l Conf. on Network Protocols, Atlanta, Ga., October 1997, pp. 205–211 suggests that systems implement ten times as many buffers as flows. Large buffers should be possible in routers since the cost of memory is dropping rapidly. Many router vendors adopt the "one round-trip time" buffering approach. Although this is a step in the right direction, this only addresses the link utilization problem, but not the packet loss problem.

Even though adequate buffering proportional to the total number of active flows is required to support high number of TCP flows, the combination of adequate buffering and active queue management based on random early detection (RED) provides support to a large number of flows attempting to use full link bandwidth. This combination allows high link utilization and eliminates the possibility of degradation or collapse in link utilization due to excessive window size limits set by end users. The basic idea behind active queue management schemes such as those described in U.S. patent application Ser. No. 09/455,445, filed December 1999, and S. Floyd and V. Jacobson, "Random Early Detection Gateways for Congestion Avoidance," IEEE/ACM Trans. on Networking, Vol. 1, No. 4, August 1993, pp. 397–413, is to detect incipient congestion early and to convey congestion notification to the end-systems, allowing them to reduce their transmission rates before queues in the network overflow and excessive packet loss occurs.

Most RED schemes maintain an average of the queue length which they use together with a number of queue thresholds to detect congestion. RED schemes drop incoming packets in a random probabilistic manner where the probability is a function of recent buffer fill history. The objective is to provide a more equitable distribution of packet loss, avoid the synchronization of flows, and at the same time improve the utilization of the network. The setting of the queue thresholds in RED schemes is problematic because the required buffer size (and consequently queue thresholds) for good sharing among TCP connections is dependent on the number of TCP connections using the buffer. To keep latency at the router low, it may be desirable to set the thresholds low. But setting it too low will cause many timeouts (when the number of connections is large) which drastically degrade the latency perceived by the user. On the other hand, setting the thresholds too high unnecessarily increases the latency when operating with a small number of connections. This means the setting of the thresholds should not be done in an ad hoc manner but should also be tied to the number of active connections sharing the buffer. The danger of not tying the RED thresholds (and buffer size) to the number of active connections is that, for example, a RED queue (as described in S. Floyd and V. Jacobson, "Random Early Detection Gateways for Congestion Avoidance," IEEE/ACM Trans. on Networking, Vol. 1, No.4, August 1993, pp. 397–413) operating with a large number of connections can cause the average queue size to exceed the maximum RED threshold, causing the router to operate as a drop-tail router and resulting in high packet loss rates and TCP timeouts.

In view of the foregoing, it would be desirable to provide a technique for network queue management which overcomes the above-described inadequacies and shortcomings. More particularly, it would be desirable to provide a technique for dynamically allocating buffers in proportion to the number of active TCP connections in an efficient and cost effective manner.

SUMMARY OF THE INVENTION

According to the present invention, a technique for dynamically allocating a buffer is provided. In one embodiment, the technique is realized by first estimating a number of active connections. Next, a queue threshold is adjusted based, at least in part, on the number of active connections. Next, a drop probability is computed based, at least in part, on the adjusted threshold and a measured queue size. Finally, a packet drop routine is executed based upon the drop probability.

In accordance with other aspects of the present invention, estimating the number of active connections may further comprises implementing a dictionary hash technique. In some embodiments, the hash technique may comprise a bit-vector approach. In other embodiments, the hash technique may comprise a sequence number approach.

In accordance with other aspects of the invention, estimating a number of active connections may further comprise filtering the estimated number of active connections.

In accordance with still other aspects of the invention, adjusting a queue threshold may further comprise setting the queue threshold according to the relation $$\max\left\{\frac{P}{2\hat{N}(n)-1}, \gamma\hat{N}(n)\right\},$$

where P is a bandwidth-delay product, $\hat{N}(n)$ is an estimated number of active connections at measurement time n, and $\gamma$ is a predetermined parameter that represents a minimum number of packets buffered per connection to avoid a TCP timeout. In some embodiment, the predetermined parameter is equivalent to six packets per connection.

In accordance with still other aspects of the invention, computing a drop probability may further comprise sampling the queue size q(n) at a time n. Next, an error signal e(n), at time n, may be calculated according to the relation e(n)=q(n)−T(n), where T(n) is the queue threshold at time n. Next, a drop probability $p_d(n)$, at time n, may be calculated according to the relation $$p_d(n) = \min\left\{\max\left[p_d(n-1) + \alpha\frac{e(n)}{2T(n)}, 0\right], \theta\right\}$$

where $\alpha$ is a control gain parameter and $\theta$ is a predetermined upper limit on the drop probability. Finally, the calculated error signal and the calculated drop probability may be stored for use in calculating a drop probability at time n+1. In some embodiments, calculating an error signal e(n) may further comprise filtering the error signal e(n) according to the relation: $(1-\beta)\hat{e}(n-1)+\beta e(n)$, where $\beta$ is a filter gain parameter and $\hat{e}(n-1)$ is the filtered error signal at time n−1.

According to still further aspect of the invention executing a packet drop routine may further comprise dropping packets according to a random number generator drop scheme. In other embodiments, executing a packet drop routine may further comprise dropping packets according to an inter-drop interval count routine.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

This application discloses an improved active queue management scheme which dynamically changes its queue threshold (or control target) settings as the number of connections or flows changes. By adjusting the queue thresholds as a function of the number of active flows, network devices (e.g., routers, switches, etc.) can effectively control packet losses and TCP timeouts while maintaining high link utilization. The technique also allows a network to support a larger number of connections during congestion periods. The scheme proposed here addresses the issue of queue threshold setting in proportion to the active number of flows. In some embodiments of the scheme, an estimate of the number of active flows is used to compute a queue threshold (or control target) at which the queue size should be maintained.

Figure 1:
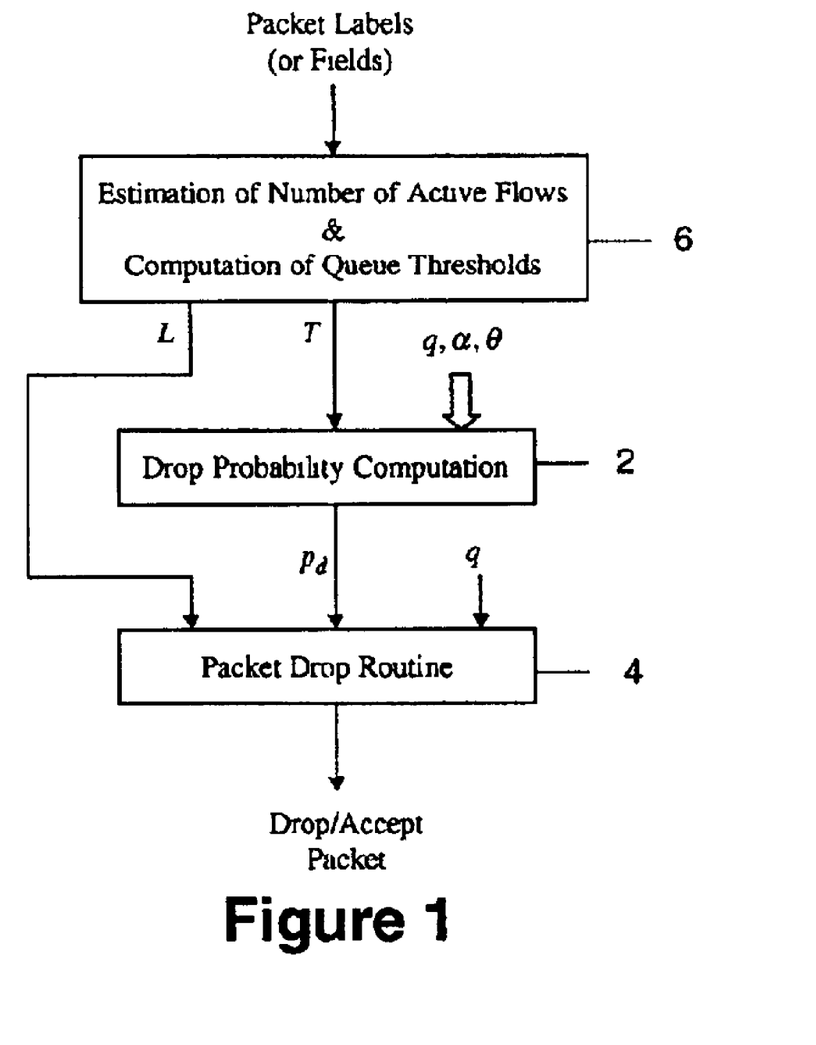
FIG. 1 is a flow diagram of the overall buffer management scheme according to one embodiment of the invention.

A high-level description of the overall active queue management scheme according to one embodiment is given in FIG. 1. This architecture implements the following modules.

A module 2 for computing the packet drop probabilities at the network node queue (e.g., switch, router, etc.); a module 4 for dropping packets in accordance with the computed packet drop probabilities; and a module 6 for counting the effective number of active connections (or flows) in the system, which is then used to compute the required queue thresholds for the packet drop probability computations.

Description of the various parameters indicated in FIG. 1 will be given in the following sections.

Existing systems, for example, U.S. patent application Ser. No. 09/455,445, filed December 1999, describe a mechanism that uses a simple control-theoretic approach to randomly discard packets with a load-dependent probability when a buffer in a network device gets congested. The mechanism maintains the average queue size close to a predetermined threshold, but allows transient traffic bursts to be queued without unnecessary packet drops. The following section, is a brief overview of the packet drop probability computations required for the active queue management scheme.

The packet drop algorithm as described in the Ser. No. 09/455,445 application, for example, is a mechanism for congestion control (e.g., controlling the queue size) at a line interface of a network device. In some embodiments, the algorithm controls congestion by randomly dropping packets with a probability $p_d$, which constitute a signal to applications (TCP sources) to reduce their sending rate. In some embodiments, the algorithm takes its decision of dropping or accepting an incoming packet so that the queue occupancy level is kept at a given target level, thereby eliminating buffer underflow and overflow as much as possible.

According to some embodiments, the actual queue size in the switch or router is assumed to be sampled every $\Delta t$ units of time (seconds), and the packet drop controller provides a new value of the drop probability $p_d$ every $\Delta t$ units of time. Therefore, $\Delta t$ is the sampling/control interval of the system. The control system may be described in discrete time.

Let $q(n)$ denote the actual queue size and $T(n)$ the target buffer occupancy (which is determined in proportion to the number of active flows), at discrete time n, where $n=1\Delta t, 2\Delta t, 3\Delta t, \ldots$. It is desirable to determine a drop probability $p_d$ which will drive the queue size to this target buffer occupancy. So we adapt $p_d$ to react to the actual queue dynamics experienced at the node using a simple control mechanism: if the actual queue size q is smaller than the target queue size T, $p_d$ is decreased to make aggressive usage of the available resources, and vice versa if the actual queue size is high.

The goal of the controller is therefore to adapt $p_d$ so that the magnitude of the error signal $$e(n)=q(n)-T(n)$$

is kept as small as possible. Due to the burstiness of the network traffic and other perturbations, this error signal is highly fluctuating, so that some low pass filtering is desirable.

The first part of the controller is a discrete-time first-order low-pass filter with gain $0<\beta<1$. The filtered error signal is given by $$\hat{e}(n)=(1-\beta)\hat{e}(n-1)+\beta e(n).$$

The second part of the controller is then the incremental adaptation of the drop probability $p_d$ proportional to the filtered error signal $$p_d(n)=p_d(n-1)+\alpha \hat{e}(n),$$

where $\alpha$ is a control gain. Note that $p_d(n)$ is always bounded by $0 \leq p_d(n) \leq 1$, for all n. The basic recursion $p_d(n)=p_d(n-1)+\alpha e(n)$ implements the standard summation or integral control scheme since $\Delta p_d(n)=p_d(n)-p_d(n-1)=\alpha e(n)$ or $p_d(n)=\alpha \Sigma_{i=0}^{n} e(i)$, in discrete-time (and $dp_d(t)/dt=\alpha e(t)$ or $$p_d(t) = \alpha \int_0^t e(\tau) d\tau,$$

in continuous-time).

In some embodiments, the normalized error signal is used instead, resulting in the control equation $$p_d(n) = p_d(n-1) + \alpha \frac{\hat{e}(n)}{2T(n)},$$

where the term $2T(n)$ serves only as a normalization parameter. Note also that filtering the error signal $e(n)$ is equivalent to filtering the sampled queue size $q(n)$ for constant T, thus, the control equation can also be expressed as $$p_d(n) = p_d(n-1) + \alpha \left[\frac{\hat{q}(n) - T}{2T}\right],$$

where $\hat{q}(n)$ denotes the filtered queue size. Filtering of the error signal e or queue size q also has the important benefit of allowing traffic bursts to be queued without being unnecessarily discarded. This is because congestion is detected by comparing the average queue size to a predetermined threshold. In effect, only the average queue size is controlled, allowing transient traffic bursts to be accommodated in the queue.

Listed below are the parameters that affect the control performance for some embodiments of the invention:

(1) Sampling intervals ($\Delta t$ and $\Delta s$): $\Delta t$ and $\Delta s$ are the time intervals for taking measurements and applying the computed $p_d$ and T controls, respectively, e.g., $\Delta t=10$ packet transmission time and $\Delta s=1$ sec.

(2) Control gain ($\alpha$): This controls the reaction speed and stability of the control system. A recommended value when measurements are done on a packet by packet basis is $\alpha=0.00005$. Other values are possible.

(3) Filter gain ($\beta$): This controls the reaction speed of the filter. A recommended value is $\beta=0.002$. Other values are possible.

(4) Control target (i.e., computed queue threshold, T, based on the number of active flows): This sets the average buffer utilization level and average queuing delay, since the average queue size evolves around this value.

(5) Buffer size (B): This is the buffer size allocated to the connections or flows anticipated in the system.

(6) "No-drop" threshold (L): This is a threshold lower than T, below which no packets are dropped even though $p_d$ can be greater than zero. This helps to maintain high link utilization and keep the average queue size around the target level. L should always be a little lower than T, i.e., $L=bT$, $b \in [0.8, 0.9]$. A recommended value is $L=0.9T$. Other values are possible. A new L value is always computed for every new T value.

Figure 2:
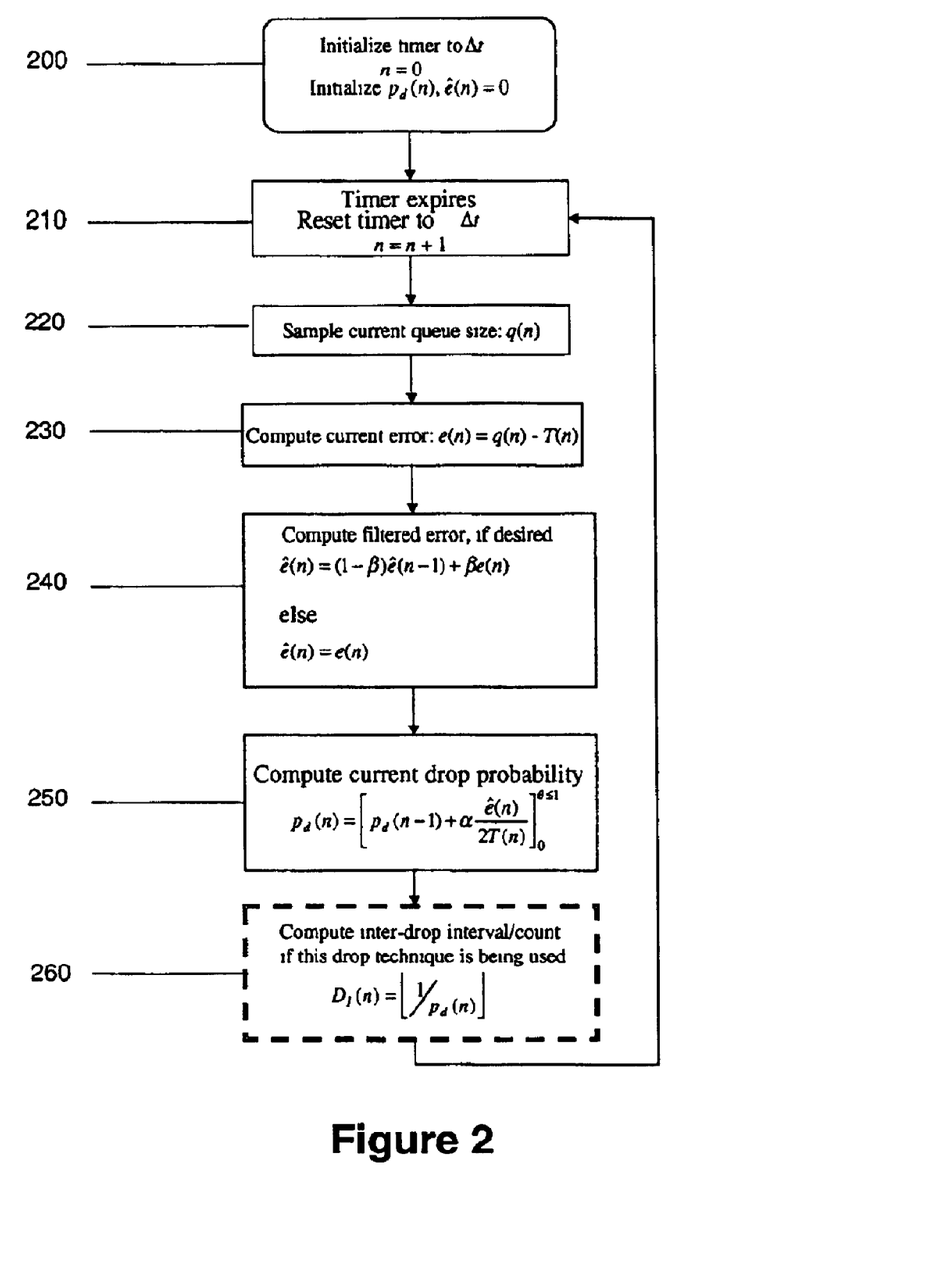
FIG. 2 is a flow diagram for the calculation of packet drop probabilities according to one embodiment of the invention.

FIG. 2 presents a flowchart of the drop probability computations. This figure also includes the computation of the inter-drop intervals/counts (to be described later) if this drop technique is adopted at the queue. The computations of the packet drop probabilities can be summarized as follows.

As shown in FIG. 2, the process initiates, at step 200, at discrete time n=0, by initializing certain parameters. The timer is set to $\Delta t$ time units, and drop probability $p_d(n)$ and error signal e(n) may be set to initial values. The initial drop probability is used in the drop routine until the timer expires in step 210. The Timer is reset to $\Delta t$ in Step 210 to advance to the next discrete time n=n+1. Then at step 220, the queue size q(n) is measured.

At step 230, a current error signal e(n) is calculated using current threshold T(n) according to the equation e(n)=q(n)−T(n).

In some embodiments, it may be desirable to filter the calculated error signal e(n). Thus, at step 240, an optional, filtered error signal may be calculated according to $\hat{e}(n)=(1-\beta)\hat{e}(n-1)+\beta e(n)$.

At step 250, a current drop probability $p_d(n)$ is calculated according to $$p_d(n) = \min\left\{\max\left[p_d(n-1) + \alpha \frac{\hat{e}(n)}{2T(n)}, 0\right], \theta\right\}$$

An upper bound on the drop probability may be introduced by selecting the appropriate limit $\theta \leq 1$.

The drop probability $p_d(n)$ calculated at step 250 may be used as the drop probability until time n+1, when a new $p_d$, is to be computed again. In addition, the error signal (e.g., filtered error signal) $\hat{e}(n)$ and the drop probability $p_d(n)$ are stored to be used at time n+1. An inter-drop interval drop technique may be implemented instead of the random number generator technique in which case, the interval count may be calculated as shown at step 260.

The process may then loop back to step 210 upon timer expiration for another iteration of the process.

The following section describes two mechanisms for dropping packets at the queue: the random number generator and the inter-drop interval/count approaches. The flowchart shown in FIG. 3 describes the packet drop process using the random number generator approach. The decision to accept or drop an incoming packet in the random number generator approach is mainly based on the outcome of a comparison of a randomly generated number $p_r \in [0,1]$ and the drop probability $p_d$. The procedure can be described as follows.

Figure 3:
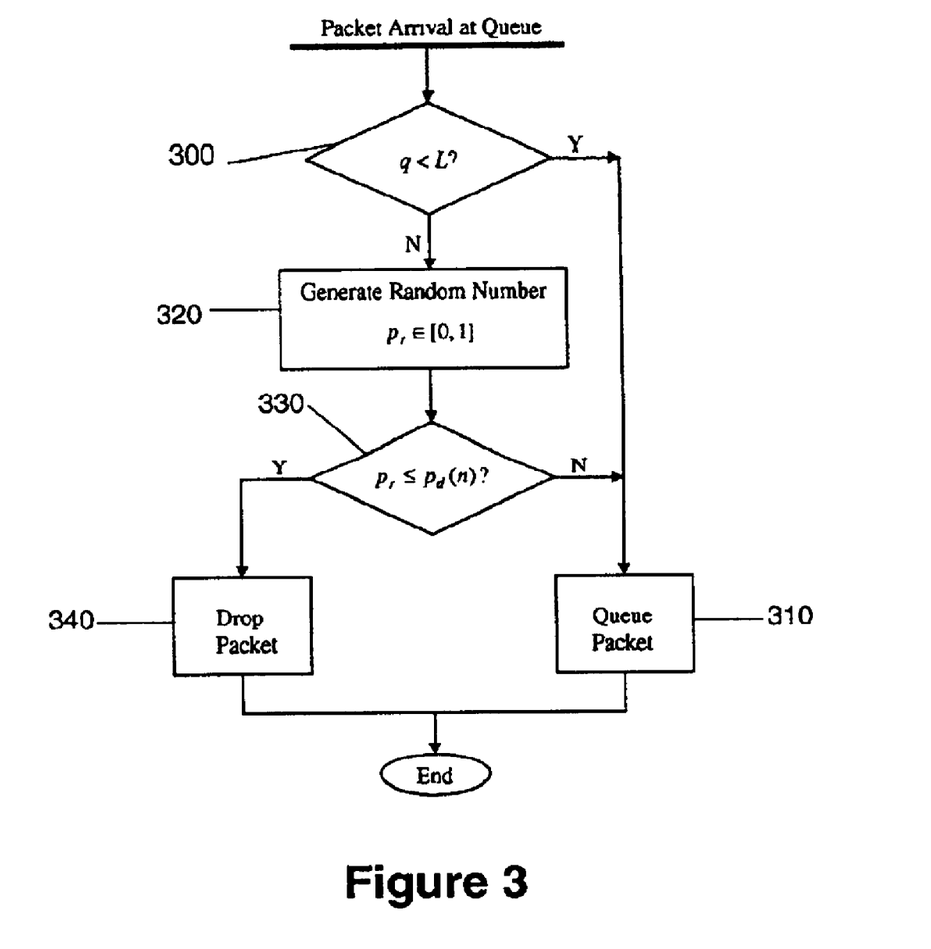
FIG. 3 is a flow diagram of a random number generator packet drop routine according to one embodiment of the invention.

Upon a packet arrival at the queue, at step 300 a determination is made whether the queue size q is less than the no drop threshold L. If q is less than L, then the incoming packet is queued, at step 310. If q is not less than L, then process moves to step 320 where a random number $p_r \in [0,1]$ is generated. At step 330 a determination of whether the random number $p_r$ is less than or equal to the calculated drop probability $p_d$. If $p_r$ is less than or equal to $p_d$, then the packet is dropped at step 340. If not, the packet is queued at step 310.

The parameter L (L<T) is introduced in the control process (e.g., at step 300) to help maintain high link utilization and keep the queue size around the target level. The drop routine does not drop packets when q(n)<L in order to maintain high resource utilization and also not to further penalize sources which are in the process of backing off in response to (previous) packet drops. Note that there is always a time lag between the time a packet is dropped and the time a source responds to the packet drop. The computation of $p_d$, however, still continues even if packet dropping is suspended (when q(n)<L).

Figure 4:
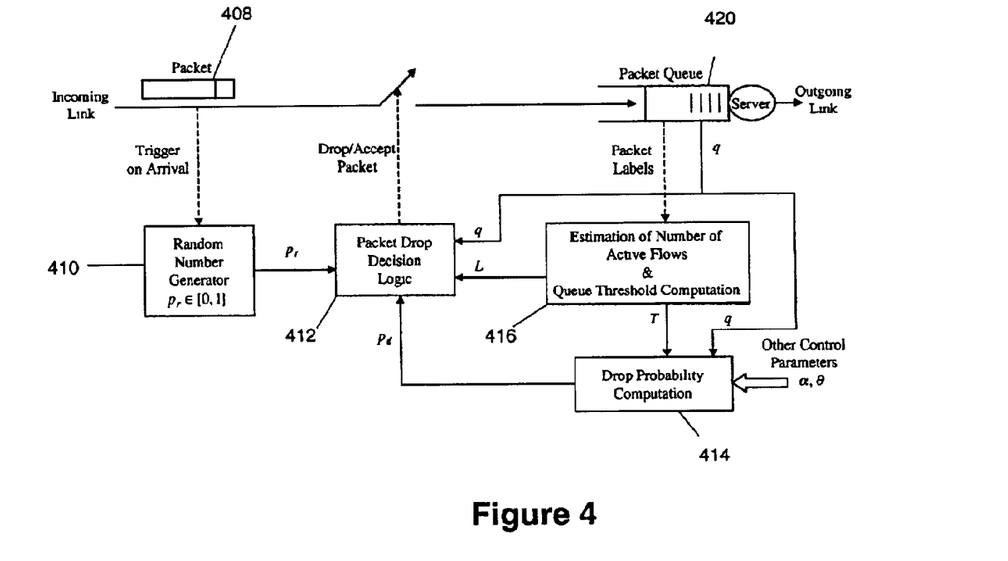
FIG. 4 is a block diagram of a random number generator drop routine according to one embodiment of the invention.

A functional block diagram of the random number generator approach is given in FIG. 4. As shown, a random number generator 410 may be triggered upon arrival of a packet 408. Random number generator 410 generates a random number $p_r$, which is supplied to packet drop decision logic 412. Also supplying input to packet drop decision logic 412 are drop probability computation module 414 and active flow estimation and queue threshold calculation module 416. As described above, packet decision logic 412 controls whether a packet (e.g., packet 408) is forwarded to queue 420 or not.

An alternative to the random number generator approach is to use a simple count mechanism based on the drop probability values. The use of the drop probability metric gives a good indication of the amount of packets that should be dropped in order to achieve a given loss rate. As a result, the inverse of a drop probability value indicates the interval in packets until the next packet drop. That is, the inverse of the drop probability gives an inter-drop interval/count. For instance, for a drop probability $p_d$, the inter-drop interval/count $\lfloor 1/p_d \rfloor$ indicates that one out of every $\lfloor 1/p_d \rfloor$ packets should be dropped. Thus, one implementation of a drop mechanism consists of the following process as shown in FIG. 5.

At step 500 initial parameters may be set. For example, a counter may be set to an initial value (e.g., equal to zero). Upon occurrence of a triggering event (e.g., arrival of a packet at a queue) the counter may be incremented as shown at 510 (e.g., count +1).

In FIG. 2, Step 260, for each calculation of a new drop probability $p_d$, there is also computed an inter-drop interval/count $$D_I = \left\lfloor \frac{1}{p_d} \right\rfloor \text{ (in units of packets)}.$$

Figure 5:
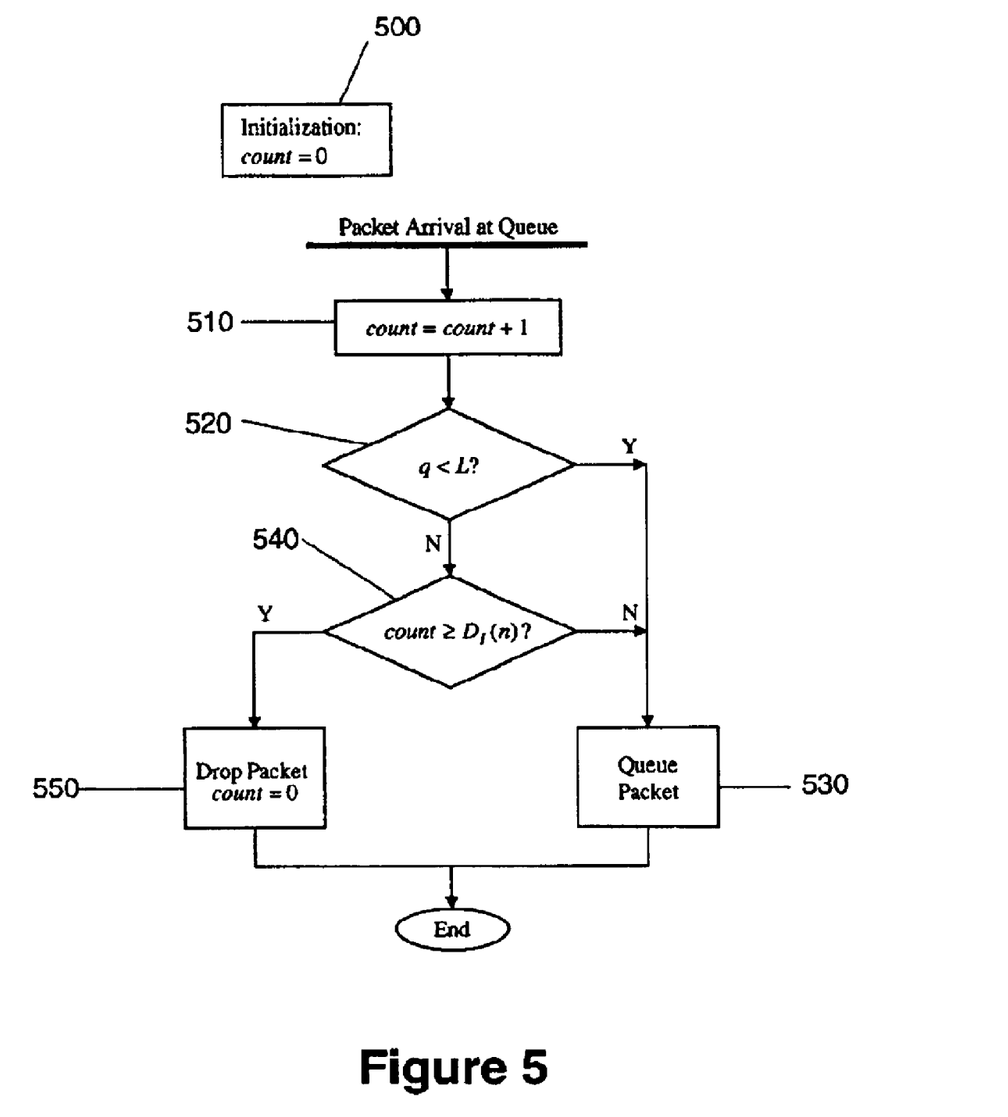
FIG. 5 is a flow diagram of an inter-drop interval count packet drop routine according to one embodiment of the invention.

In FIG. 5, at step 520, a determination of whether the queue size q is less than the drop threshold L is made.

If q<L, then, at step 530, the incoming packet is queued.

If q is not less than L, then, at 540, a determination of whether count $\geq D_I$, is made. If count is greater than or equal to D, then drop the incoming packet and reset count=0 at step 550. Otherwise, queue the incoming packet at 530.

Figure 6:
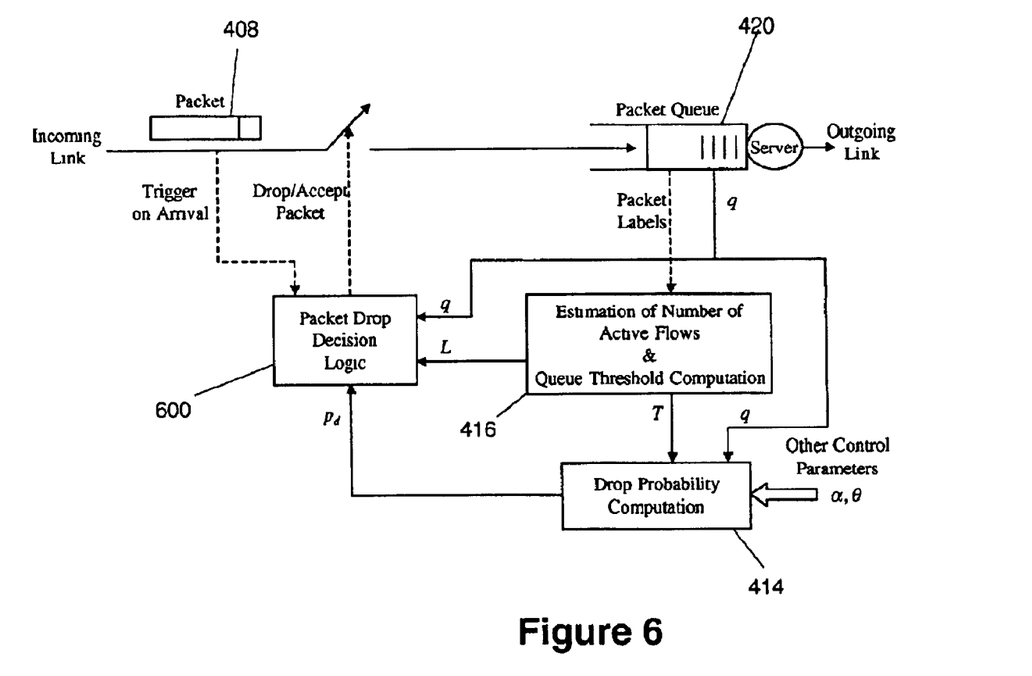
FIG. 6 is a block diagram of an inter-drop interval count packet drop routine according to one embodiment of the invention.

The functional block diagram of this approach is shown in FIG. 6. In FIG. 6, packet drop decision logic 600 controls whether or not a packet (e.g., packet 408) is forwarded to queue 420.

In some embodiments, an estimate of the number of active connections (or flows) is needed in order to determine the control target (or queue threshold), T. required for the packet drop probability computations, and the "no-drop threshold", L, required for the packet drop routines. It is assumed that these thresholds are determined every $\Delta s$ measurement interval.

To count the number of active flows, some embodiments adopt known "dictionary hash" techniques (e.g., as described in L. Carter, et al., "Exact and Approximate Membership Testers," Proc. $10^{th}$ Annual ACM Symposium on Theory of Computing, May 1978, pp. 59–65 and P. E. McKenney, "High-Speed Event Counting and Classification using a Dictionary Hash Technique," International Conference on Parallel Processing, 1989, pp. III-71–75) for high-speed event counting and packet classification. The techniques can stochastically determine the number of unique labels quickly and with a small amount of memory when presented with a large group of labeled events.

In some embodiments of the active queue management scheme, the labeled events are packet arrivals at the packet queue and a label can consist of a packet's source and destination addresses, and source and destination port numbers. The set of all packets with a unique combination of source and destination addresses, and source and destination port pair constitutes a "session".

Below is a description of the main ideas behind some dictionary hashing techniques.

Figure 7:
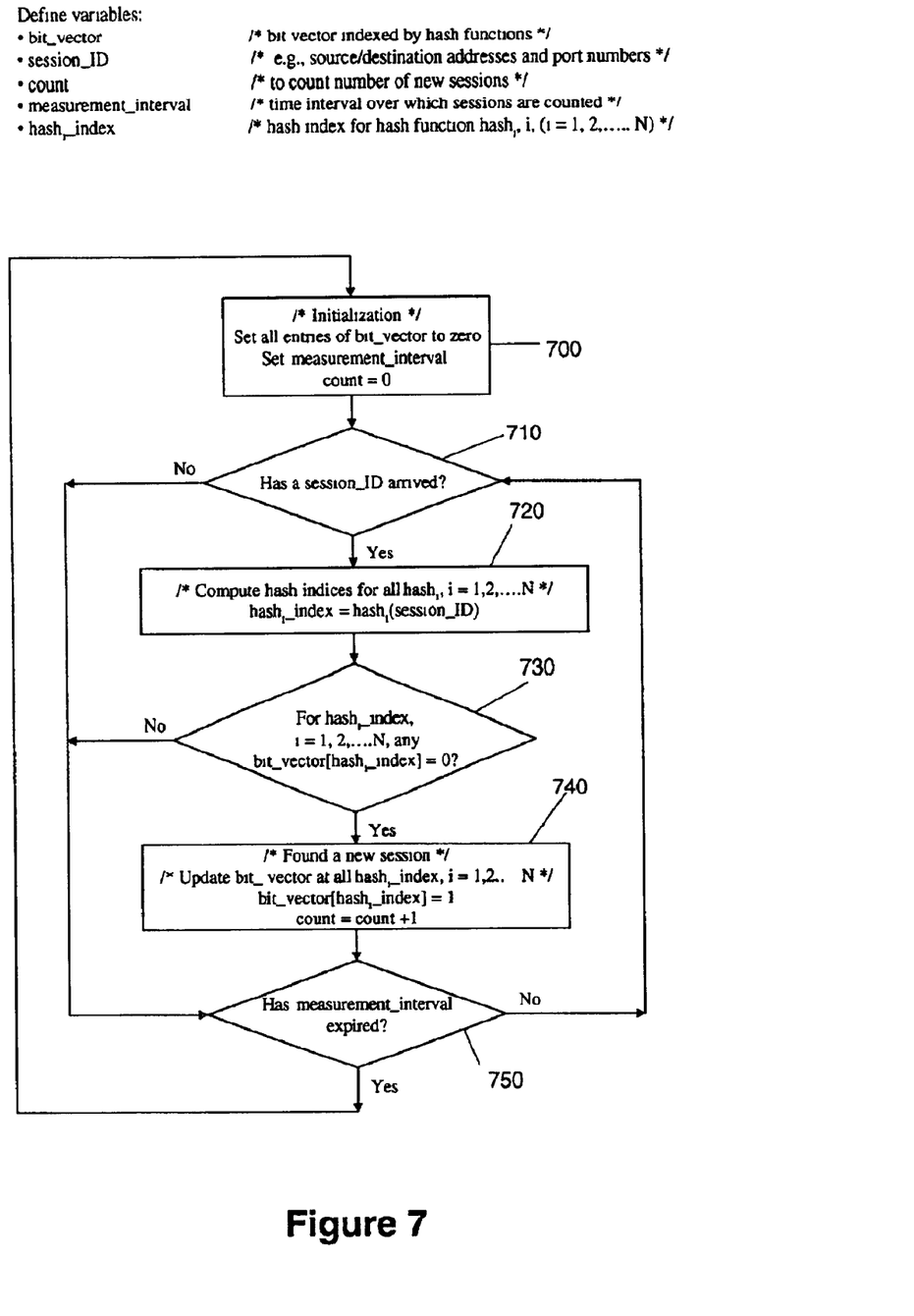
FIG. 7 is a flow diagram illustrating a bit-vector approach for event counting according to one embodiment of the invention.

The bit vector approach for event counting is illustrated in FIG. 7.

In some embodiments a bit-vector is maintained which is hashed into by multiple hash functions. This algorithm can be used to stochastically count the number of sessions passing though a network node during a predetermined measurement period. The bit vector is initialized to zero at step 700. As each packet arrives at the node (e.g., as determined at step 710), a string consisting of that packet's source and destination addresses, and source and destination port numbers is hashed (e.g., at step 720) by each of the hash functions. If the bit indexed by any of the hash functions is zero (e.g., as determined at step 730), the packet is known to belong to a session that has not yet been counted. On the other hand, if all the bits indexed by the hash functions are one, the packet has some probability (1−ε) of belonging to a session that has already been counted, where ε depends on the size of the vector, the number of hash functions, and the number of sessions to be counted (P. E. McKenney, supra, shows how this probability can be made close to 1). Any zero-bits indexed by a hash function are set to one (at step 740), thus a subsequent packet belonging to the same session will be recognized as having already been counted.

This algorithm requires that the entire bit-vector be set to zero at the beginning of each measurement period. Thus, at step 750 the process loops back to step 700 upon the expiration of the measurement interval.

Figure 8:
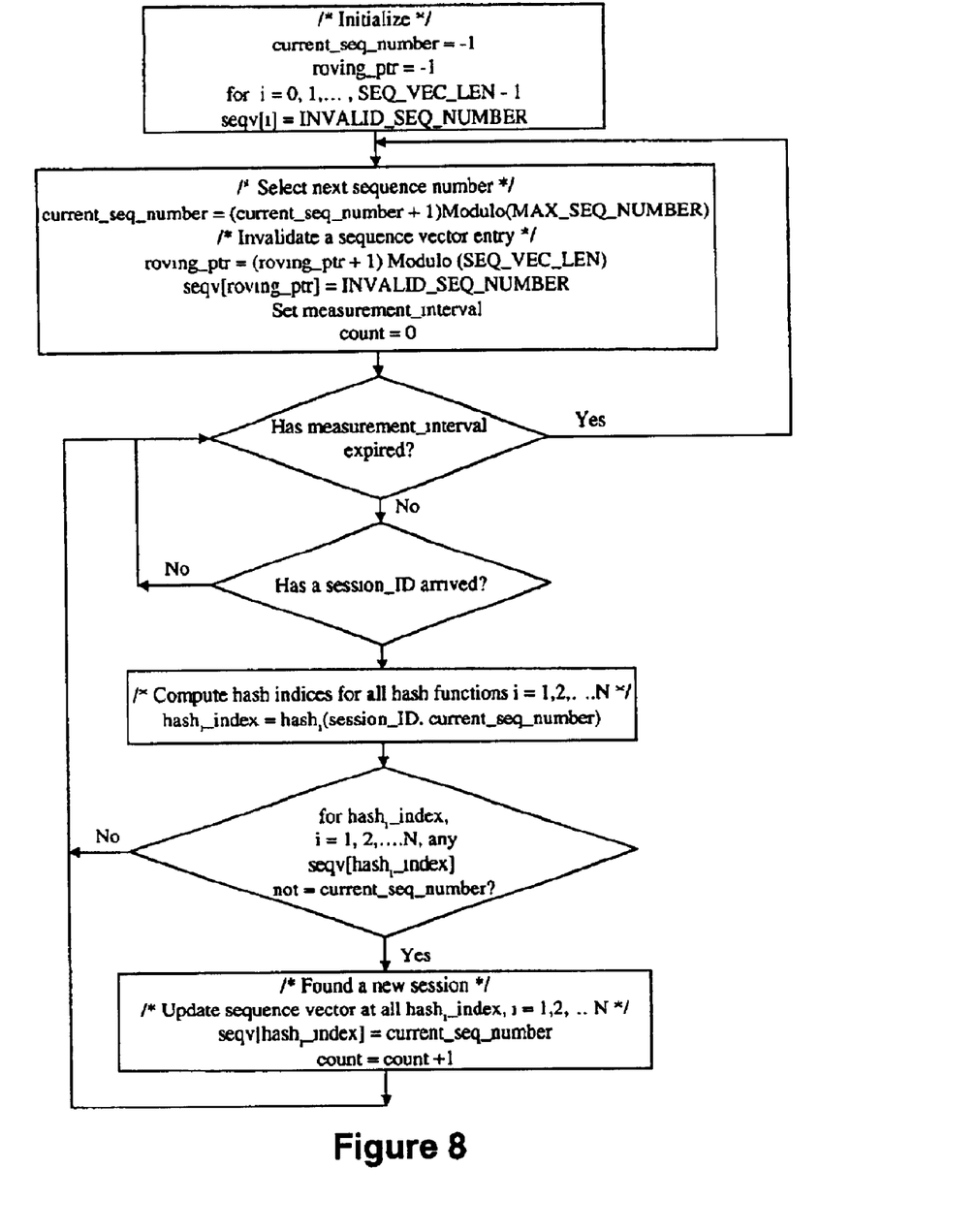
FIG. 8 is a flow diagram illustrating the sequence number approach for event counting according to one embodiment of the invention.

The flow chart shown in FIG. 8 describes how the sequence number approach for event counting works. A higher number of hash functions is normally possible with a software implementation.

The sequence number algorithm modifies the bit-vector approach by replacing the bit-vector with a vector of sequence numbers. A global sequence number is incremented at the beginning of each measurement period, and instead of being checked for bits being set, sequence numbers are checked for equality to the current global sequence number. If at least one of the sequence numbers in the vector differs from the current global sequence number, the packet belongs to a session that has not yet been counted; otherwise, the packet has some probability (1−ε) of belonging to a session that has already been counted.

Two important boundary conditions may be accounted for: (1) overflow of the global sequence number and (2) persistence of errors from one measurement period to the next.

In order to prevent old sequence numbers from persisting for a full cycle of the global sequence number, a roving pointer into the vector must be maintained. At the beginning of each measurement period, the entry currently pointed to is set to an illegal number (e.g., if a 16-bit unsigned sequence number ranges from zero to 65535, then 131071 is an illegal sequence number). The number of legal values for the sequence number must be greater than the number of entries in the vector (and thus the word size of the sequence number must be at least ($\lceil \log_2 A \rceil + 1$) bits, where A is the vector size). Finally, the quantity to be hashed must include the current value of the sequence number as well as the label (i.e., source and destination addresses, and source and destination port numbers) within the packet to avoid persistent errors.

Since this dictionary hash technique is composed of simple operations and is of time complexity O(1), it is an ideal candidate for implementation in hardware for very high-speed operations. However, to allow a parallel implementation of the technique, each hash function must be given its own private RAM (random access memory) vector (or multiport RAMs can be used). A block diagram of an implementation using three hash functions is shown in FIG. 9.

The source and destination addresses, and source and destination port numbers (constituting the label) are extracted from each packet by the "Address Extraction" unit 900. The label is passed in parallel to the "Hardware Hash" units, (e.g., 910, 912, 914) where it is combined with the current sequence number (from sequence number unit 920), by hashing functions to yield indexes (e.g., index 1, index 2, index 3). Each "Hardware Hash" unit must use a distinct hash function that is statistically independent from that of the other units. Possible candidates for the hashing function include CRCs, checksums, and linear combinations, or the like.

The indexes and the current sequence number are passed to the "RAM Lookup" units (e.g., 922, 924, 926), each of which performs a read-modify-write cycle to the RAM location addressed by its index. If the value read from the RAM matches the current sequence number, the unit asserts its "Found" line, and in any case writes the value of the current sequence number to the RAM location addressed by the index.

Figure 9:
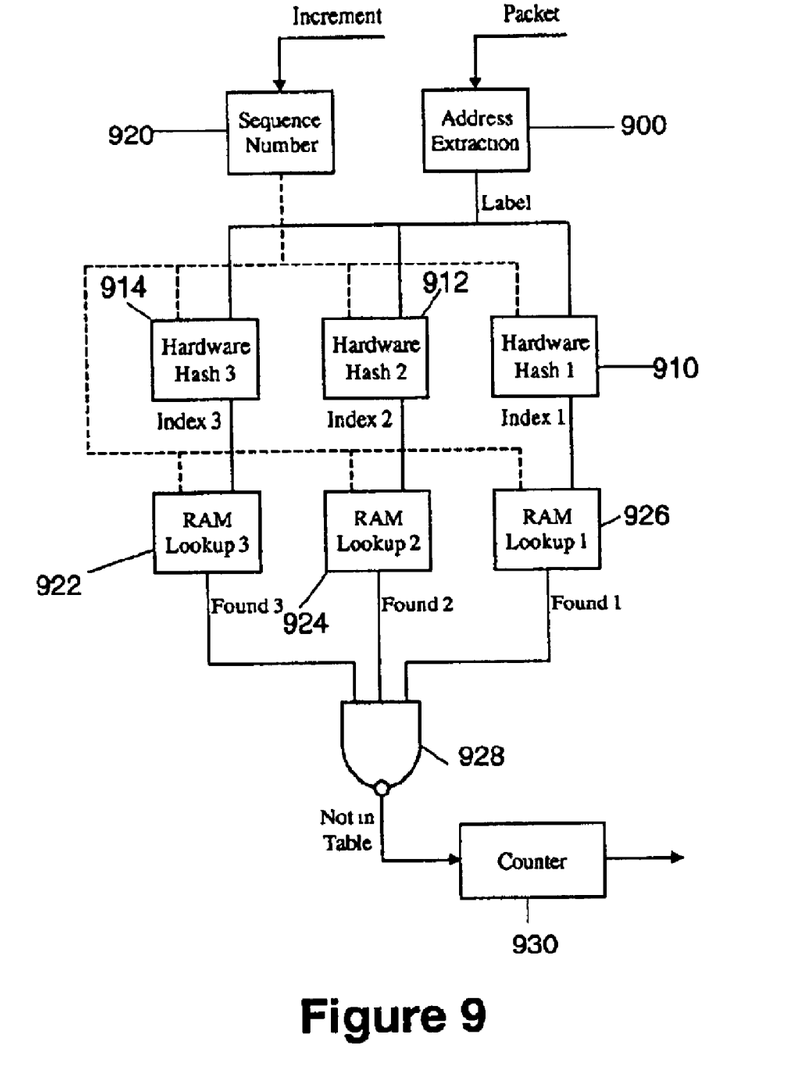
FIG. 9 is a block diagram of a hardware implementation of the sequence number event counting approach according to one embodiment of the invention.

The three-input NAND gate 928 at the bottom of FIG. 9 will assert the "Not in Table" line if any of the "Found" lines are not asserted. Thus, the "Not in Table" line will be asserted if the current packet belongs to a session that has not yet been counted. This line may be used to control a counter 930 that will produce the total number of sessions. Each "Hardware Hash" unit must also implement a roving pointer into its RAM (although a single roving pointer could be shared by all of the "Hardware Hash" units). Each time the sequence number is incremented, the RAM location addressed by the roving pointer must be set to an invalid value (i.e., a value that the sequence number will never take on), and the roving pointer must be incremented. This practice scrubs old sequence numbers from the RAM.

Some examples of design rules to aid in determining the optimal number of hash functions for a given configuration may be found in P. E. McKenney, "High-Speed Event Counting and Classification using a Dictionary Hash Technique," *International Conference on Parallel Processing*, 1989, pp. III-71–75.

Any of the two event counting techniques described above can be used in the active queue management scheme. The count of the number of active flows N, is reset to zero at the end of each measurement interval Δs. This is done so that the active number of connections in each class in a measurement interval can be refreshed.

Since the number of active connections N may vary widely with time, it is desirable to filter out the swings, while retaining information about the trend. An exponentially weighted moving average (EWMA) filter with gain $0<\eta<1$ can be used for this purpose:

$\hat{N}(n)=(1-\eta)\hat{N}(n-1)+\eta N(n)$. If no filtering is required, then $\hat{N}(n)=N(n)$.

The active queue management scheme described above tries to maintain the average queue length close to the control target T. Desirably, the setting of the queue threshold for good sharing among TCP connections must be dependent on the number of TCP connections using the buffer.

To keep latency at the router low, it may be desirable to set the thresholds low. But setting it too low will cause many timeouts (when the number of connections is large) which drastically degrade the latency perceived by the user.

On the other hand, setting the thresholds too high unnecessarily increases the latency when operating with a small number of connections. This means the setting of the threshold T should not be done in an ad hoc manner but should also be tied to the number of active connections sharing the buffer N.

For some embodiments, the control target can be determined in one of two ways given an estimate of the number of active connections.

If the number of connections is large, the network device queues about 6 packets per connection. For example, as explained in R. Morris, "Scalable TCP Congestion Control," *Proc. IEEE INFOCOM* 2000, pp. 1176–1183, six packets are just enough to avoid forcing TCP connections into timeout.

If the number of connections is small, however, 6 packet buffers per connection may be too small to keep the network link busy. Let P denote the bandwidth-delay product of the network (in packets) and q be the number of packets buffered by the network device. If one connection is considered, for example, the TCP window size can vary between (q+P)/2 and (q+P). If q<P, TCP would not be able to keep the link busy after each window decrease. With N connections, there must be enough buffer space such that q≧(q+P)/2N, or in other words, for the network to be busy when the number of connections is small, the network device must buffer q≧P/(2N−1) packets.

From these two points, the control target, T, of the active queue management scheme can be determined as follows:

$$T(n) = \max\left\{\frac{P}{2\hat{N}(n) - 1}, \gamma \hat{N}(n)\right\},$$

where $\hat{N}(n)$ is an estimate of the number of active connections at measurement time n and γ is a parameter that represents the number of packets that must be buffered per connection just enough to avoid forcing a TCP connection into timeout. The parameter γ is equal to 6 in the above discussion, but γ can be in the range of 4 to 8 packets.

The rational for setting γ=6 can be explained as follows. TCP fast retransmission mechanism cannot recover from a packet loss without a timeout if the window size is less than four packets. If TCP's window is always to be 4 or more packets, its divide-by-two decrease policy means the window must vary between 4 and 8, averaging 6. The parameter P can be set by the network manager to the product of the link bandwidth and an estimate of the round trip time of a typical connection. A rough estimate of P is adequate for computing the control target since P is only important when the number of connections is small.

Note the queue management mechanism maintains the average queue size close to the predetermined threshold T(n), thereby allowing transient traffic bursts to be queued without unnecessary packet drops. The overall effect of the queue management mechanism is to cause each competing TCP connection to use a window of at least 6 packets which is the minimum window that avoids frequent timeouts.

The present invention enables a network device (e.g., router, switch, etc.) to store extra packets during periods of congestion, instead of dropping packets. This significantly reduces the packet loss rate, and ultimately the number of TCP timeouts. This scheme can be effectively used in network devices with large buffers without causing any excessive queuing delay, since the buffers are consumed in proportion to the level of congestion. Also, the scheme automatically achieves a good tradeoff between packet loss rate and queuing delay over a wide range of loads. The scheme is particularly attractive for the deployment of networks supporting a wide range of connections (from large to small and vice versa).

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for dynamically allocating a buffer, the method comprising:

estimating a number of active connections;

adjusting a queue threshold for a queue by setting the queue threshold (T(n)) according to the relation:

$$T(n) = \max\left\{\frac{P}{2\hat{N}(n) - 1}, \gamma \hat{N}(n)\right\},$$

where P is a bandwidth-delay product, $\hat{N}(n)$ is an estimated number of active connections at measurement time n, and γ is a predetermined parameter that represents a minimum number of packets buffered per connection to avoid a TCP timeout;

computing a drop probability based, at least in part, on the adjusted threshold and a measured queue size;

executing a packet drop routine based upon the drop probability.

2. The method of claim 1 wherein the step of estimating a number of active connections further comprises:

filtering the estimated number of active connections.

3. The method of claim 1 wherein the step of computing a drop probability further comprises:

sampling the queue size q(n) at a time n;

calculating an error signal e(n), at time n according to the relation e(n)=q(n)−T(n), where T(n) is the queue threshold at time n; and calculating a drop probability $p_d(n)$ at time n according to the relation $$p_d(n) = \min\left\{\max\left[p_d(n-1) + \alpha \frac{e(n)}{2T(n)}, 0\right], \theta\right\},$$

where α is a control gain parameter and θ is a predetermined upper limit on the drop probability.

4. The method of claim 3 wherein the step of calculating an error signal e(n) further comprises:

filtering the error signal e(n) according to the relation: (1−β)ê(n−1)+βe(n), where β is a filter gain parameter and ê(n−1) is the filtered error signal at time n−1.

5. The method of claim 1 wherein the step of executing a packet drop routine further comprises:

dropping packets according to a random number generator drop scheme.

6. The method of claim 1 wherein the step of executing a packet drop routine further comprises:

dropping packets according to an inter-drop interval count routine.

7. An apparatus for dynamically allocating a buffer, the apparatus comprising:

an active connection estimator for estimating a number of active connections;

a queue threshold adjuster for adjusting a queue threshold for a queue, the queue threshold adjuster further comprising a module for setting the queue threshold (T(n)) according to the relation:

$$T(n) = \max\left\{\frac{P}{2\hat{N}(n) - 1}, \gamma \hat{N}(n)\right\},$$

where P is a bandwidth-delay product, $\hat{N}(n)$ is an estimated number of active connections at measurement time n, and γ is a predetermined parameter that represents a minimum number of packets buffered per connection to avoid a TCP timeout;

a drop probability calculator for computing a drop probability based, at least in part, on the adjusted threshold and a sampled queue size; and a packet drop module for executing a packet drop routine based upon the drop probability.

8. The apparatus of claim 7 wherein the active connection estimator further comprises:

a filter for filtering the estimated number of active connections.

9. The apparatus of claim 7 wherein the drop probability calculator further comprises:

a queue size sampler for sampling the queue size q(n) at a time n;

an error signal calculator for calculating an error signal e(n), at time n according to the relation e(n)=q(n)−T(n), where T(n) is the queue threshold at time n; and a module for calculating a drop probability $p_d(n)$, at time n according to the relation $$P_d(n) = \min\left\{\max\left[p_d(n-1) + \alpha \frac{e(n)}{2T(n)}, 0\right], \theta\right\},$$

where α is a control gain parameter and θ is a predetermined upper limit on the drop probability.

10. The apparatus of claim 9 wherein the error signal calculator further comprises:

a filter for filtering the error signal e(n) according to the relation: $(1-\beta)\hat{e}(n-1)+\beta e(n)$, where β is a filter gain parameter and $\hat{e}(n-1)$ is the filtered error signal at time n−1.

11. The apparatus of claim 7 wherein the packet drop module further comprises:

a random number generator drop scheme module.

12. The apparatus of claim 7 wherein the packet drop module further comprises:

an inter-drop interval count routine module.

13. An article of manufacture for dynamically allocating a buffer, the article of manufacture comprising:

at least one processor readable carrier; and instructions carried on the at least one carrier;

wherein the instructions are configured to be readable from the at least one carrier by at least one processor and thereby cause the at least one processor to operate so as to:

estimate a number of active connections;

adjust a queue threshold for a queque by setting the queue threshold (T(n)) according to the relation:

$$T(n) = \max\left\{\frac{P}{2\hat{N}(n)-1}, \gamma\hat{N}(n)\right\},$$

where P is a bandwidth-delay product, $\hat{N}(n)$ is an estimated number of active connections at measurement time n, and γ is a predetermined parameter that represents a minimum number of packets buffered per connection to avoid a TCP timeout;

compute a drop probability based, at least in part, on the adjusted threshold and a measured queue size;

execute a packet drop routine based upon the drop probability.

14. A signal embodied in a carrier wave and representing sequences of instructions which, when executed by at least one processor, cause the at least one processor to dynamically allocate a buffer by performing the steps of:

estimating a number of active connections;

adjusting a queue threshold for a queue by setting the queue threshold (T(n)) according to the relation:

$$T(n) = \max\left\{\frac{P}{2\hat{N}(n)-1}, \gamma\hat{N}(n)\right\},$$

where P is a bandwidth-delay product, $\hat{N}(n)$ is an estimated number of active connections at measurement time n, and γ is a predetermined parameter that represents a minimum number of packets buffered per connection to avoid a TCP timeout;

computing a drop probability based, at least in part, on the adjusted threshold and a measured queue size;

executing a packet drop routine based upon the drop probability.

* * * * *